United States Patent [19]

Niki et al.

[11] 3,959,517

[45] May 25, 1976

[54] METHOD OF PREPARING FISH MEAT POWDER HAVING KAMABOKO-FORMING PROPERTY

[75] Inventors: Hiroshi Niki; Eiki Deya; Toru Doi, all of Sapporo; Seiichiro Igarashi, Tokorozawa; Kenkichi Ahiko; Hiromichi Hayashi, both of Sapporo, all of Japan

[73] Assignee: Snow Brand Milk Products Co., Ltd., Sapporo, Japan

[22] Filed: Mar. 13, 1975

[21] Appl. No.: 557,995

[30] Foreign Application Priority Data
  Aug. 9, 1974  Japan .............................. 49-91272

[52] U.S. Cl. ................................ 426/643; 426/471
[51] Int. Cl.² ................................................ A22C 25/00
[58] Field of Search ........... 426/573, 574, 643, 646, 426/471; 159/48 R, 4 A

[56] References Cited
UNITED STATES PATENTS

| | | | |
|---|---|---|---|
| 2,818,917 | 1/1958 | Vincent .............................. | 159/4 A |
| 3,264,116 | 8/1966 | Gray ................................ | 426/643 X |
| 3,468,674 | 9/1969 | Levin ............................... | 426/643 X |
| 3,533,805 | 10/1970 | Nava et al. ........................ | 159/48 R |
| 3,707,381 | 12/1972 | Sharp ................................ | 426/643 |

OTHER PUBLICATIONS

Altschul, A. M., "New Protein Foods," Academic Press, New York, 1974, pp. 435–437.

Primary Examiner—A. Louis Monacell
Assistant Examiner—R. A. Yoncoskie
Attorney, Agent, or Firm—Lane, Aitken, Dunner & Ziems

[57] ABSTRACT

A method is disclosed for preparing a fish meat powder from a low viscosity slurry by spray-drying. An acid which decomposes or volatilizes at the spray-drying temperature is added to the slurry to lower the viscosity.

11 Claims, 1 Drawing Figure

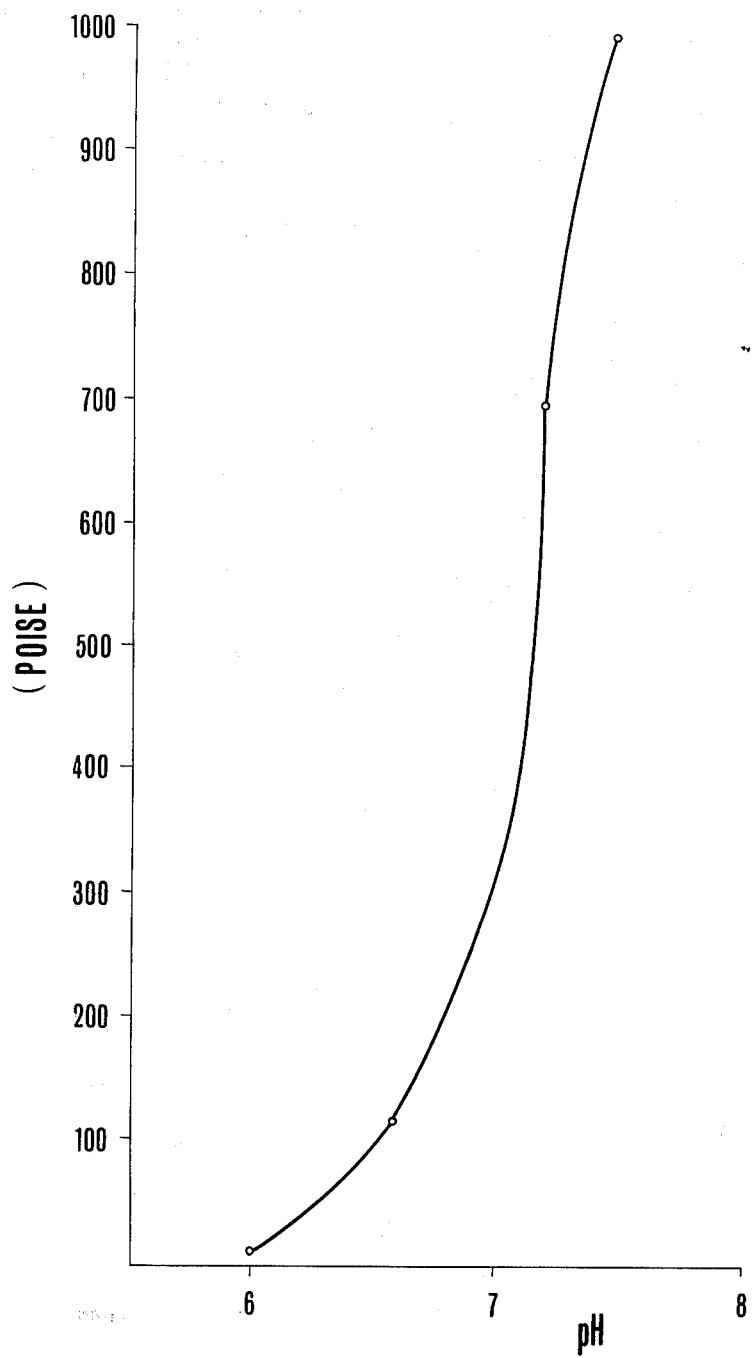

METHOD OF PREPARING FISH MEAT POWDER HAVING KAMABOKO-FORMING PROPERTY

FIELD OF THE INVENTION

This invention relates to a method of preparing fish meat powder by spray-drying fish meat in the form of slurry.

BACKGROUND OF THE INVENTION

It has recently been proposed to prepare a fish meat powder retaining the freshness of fish meat (KAMABOKO-forming property) by finely mincing fresh fish meat in the presence of a polyhydric alcohol such as sorbitol and an oligosaccharide such as sucrose to produce a slurry and then spray-drying the slurry. This method, however, encounters the disadvantage that the fish meat slurry has too high a viscosity for the spray-drying to be accomplished without difficulty.

BRIEF SUMMARY OF THE INVENTION

In view of the above, the present invention aims to provide a method for advantageously effecting the spray-drying of a fish meat slurry by lowering the viscosity of the fish meat slurry obtained by finely mincing fresh fish meat or frozen ground fish meat without denaturation of the muscular proteins of the fish meat in the slurry.

Basically, the high viscosity which the fish meat slurry, obtained by grinding fish meat, exhibits is attributable to the actomyosin protein, a principal constituent of the muscular protein. The actomyosin is extremely unstable against heat. This actomyosin contributes to the "binding property" of various food products prepared from fish meat, particularly in the magnitude of the "shape-retaining property" of such paste products as KAMABOKO. Therefore, in the conversion of the fish meat slurry into a powder by spray-drying if means are adopted to lower the viscosity of the fish meat slurry sufficiently without denaturing the actomyosin, then it becomes possible to prepare a fish meat powder retaining the KAMABOKO-forming property without impairing the nature inherent to the muscular protein of fish meat.

It has now been discovered that the viscosity of a fish meat slurry is conspicuously lowered in the acidic zone and is increased in the alkaline zone and that the muscular protein of fish meat has the highest stability against heat and loss of water when the pH value of the fish meat slurry is approximately neutral. It has been further discovered that a fish meat slurry prepared in the presence of an acid of the type easily decomposed or volatilized at relatively low spray drying temperatures has notably lower viscosity and that when this slurry is spray dried, the acid is instantaneously decomposed or volatilized into the ambient air immediately upon the slurry being sprayed through a nozzle into a current of hot air. Thus the pH value of the fish meat returns to its original level, that is, approximately neutral in the drying step, consequently preventing the denaturation of the muscular protein of the fish meat, by heat and loss of water, to a notable extent.

Accordingly, the present invention converts a fresh fish meat or frozen ground fish meat into the form of a slurry in the presence of an acid easily decomposed or volatilized at low temperatures and immediately subjecting the resultant slurry to spray-drying.

BRIEF EXPLANATION OF THE DRAWING

The sole FIGURE of the accompanying drawing graphically represents the viscosity as a function of the pH value, determined for a fish meat slurry with 8% solids content prepared by mincing a frozen ground fish meat (SURIMI) of pollack (pH 7.2), with the pH value adjusted by use of carbonic acid.

DETAILED DESCRIPTION OF THE INVENTION

The expression "acid easily decomposed or volatilized at low temperatures" as used herein, refers to an acid which is decomposed or volatilized at the relatively low temperatures prevailing in the drying chamber of the spray-drying step. (It is estimated that while the hot air at the inlet to the spray dryer is generally kept at temperatures in the range of from 125°C to 170°C, the slurry immediately after discharge from the spray nozzle is at temperatures of from 40°C to 45°C and the discharged air is at temperatures of from 55°C to 80°C.)

The fish meat to be used as the raw material for the present invention is desired to be as fresh as possible. Fish meat which has been removed from the bodies of fish, bleached with water and processed by an ordinary method or frozen meat which has been obtained by grinding the processed meat and freezing same (hereinafter referred to collectively as "raw fish meat") is suitable for use as the starting material. When fresh fish meat obtained as described above, is mixed with sorbitol or sucrose in an amount 5 – 10% by weight based on the fish meat, the fish meat retains its inherent "KAMABOKO-forming property" undiminished throughout the subsequent drying step (the term "KAMABOKO-forming property" means the property by which fish meat powder, when blended with suitable amounts of water and table salt and then heated at 90°C for 30 minutes, exhibits the same jelly strength as does fresh fish meat when it is similarly blended and heated). Accordingly it is desirable that a polyhydric alcohol such as sorbitol or an oligosaccharide such as sucrose be added to the fish meat during the preparation of the fish meat slurry. Where a frozen ground fish meat is used as the raw material, therefore, it is desirable that a frozen ground fish meat which has been prepared in the presence of sorbitol or sucrose be used. Since the muscular protein of fish meat has the highest stability when approximately neutral (pH 7.0 – 7.2), raw fish meat which has a pH value on the acidic side must be adjusted to pH 7.0 – 7.2 by addition of an alkaline salt such as a polyphosphate.

The low temperature-decomposing acid used in the conversion of raw fish meat into a slurry according to this invention, is preferably carbonic acid. Incorporation of carbonic acid into the raw fish meat is accomplished by bubbling carbon dioxide through water to prepare carbonated water with a desired pH value, adding the carbonated water to the raw fish meat which has been minced by means of a cutter and chopper, and finely kneading the resultant mixture into the form of a slurry by a colloid mill, or by mincing and converting the raw fish meat into a slurry in advance and bubbling carbon dioxide through the slurry until the pH value thereof is brought to the desired level. It should be understood that the acid to be used for this purpose in the present invention is not limited to carbonic acid and that any acid can be used in hygienically innocuous and decomposed or volatilized at temperatures which the fish meat slurry reaches during drying.

The fish meat slurry, which is obtained by subjecting the raw fish meat to mincing, shows a high viscosity of not less than 700 poises where the solids content is about 8%. When such fish meat is subjected to spray-drying, the high viscosity renders the operation difficult. When the fish meat slurry contains an acid capable of being decomposed or volatilized at low temperatures in accordance with the present invention, the pH value of the slurry is lowered to about 6.0 to 6.6 and consequently, the viscosity is lowered to a notable extent. The fish meat slurry obtained by mincing fresh fish meat or frozen ground fish meat has a pH value generally in the range of from 6.8 to 7.2, through variable to some extent depending on the type and freshness of the fish meat used as the raw material. In incorporating the low-temperature decomposing acid into the fish meat slurry in accordance with the present invention, the amount of acid should be selected taking into account the pH value of the raw fish meat so that the fish meat slurry will have a pH value approximately in the range of from 6.0 to 6.6.

The effect of the pH on the viscosity of the fish meat slurry is shown in the FIGURE of the accompanying drawing. This drawing graphically represents the viscosity as a function of the pH value, determined for a fish meat slurry with 8% solids content prepared by mincing a frozen ground fish meat (SURIMI) of pollack (pH 7.2), with the pH value adjusted by use of carbonic acid. It is seen from this graph that the viscosity falls sharply as the pH value of the ground fish meat falls below the level of 7.0.

Consequently, the spray-drying of the fish meat is greatly facilitated when the acid is incorporated into the slurry to lower the pH value and decrease the viscosity in accordance with the present invention. On the other hand, the fish meat slurry possesses its highest stability against heat and loss of water when the pH value is in the neighborhood of neutrality. At the time the slurry is spray dried to form a powder, therefore, it is necessary that the acid, which has served the purpose of lowering the viscosity of the slurry, be thermally decomposed or volatilized and thereby removed from the slurry. In other words, the slurry can be converted into powder without denaturation of the muscular protein of fish meat due to the fact that the acid present in the fish meat slurry is readily decomposed or volatilized at the slurry temperature within the spray drier and as a result, the pH value of the slurry is returned to its original level in the neighborhood of neutrality.

The effects of the use of carbonic acid, which readily decomposes at low temperatures and that of acetic acid which requires a high decomposition temperature, upon the KAMABOKO-forming property of the fish meat powder obtained by spray-drying were tested. The results of the test are shown in the following table.

Table

|  | Fish meat slurry* | | Fish meat powder** | |
|---|---|---|---|---|
|  | pH | Viscosity (poise) | pH | Jelly strength (g) |
| Carbonic acid added | 6.60 | 120 | 7.20 | 310 |
|  | 6.30 | 50 | 7.20 | 305 |
| Acetic acid added | 6.55 | 110 | 6.65 | 140 |
|  | 6.30 | 50 | 6.50 | 100 |
| No acid added | 7.20 | 700 | 7.20 | 320 |

Notes: (1) * The values were obtained at a temperature of 2°C for slurries having a solids content of 8%.
(2) ** The values were obtained for slurries reconstituted from fish powder so as to have a solids content of 8%.
(3) The values of jelly strength were obtained by kneading each fish meat powder (having a water content of 6%) with 3.7 kg of water per kg of the powder, then kneading with table salt (added in an amount of 2.7% by weight) by an ordinary method, finally kneading in the presence of about 7% by weight of starch, packing the resultant paste in a casing, heating it at 90°C for 30 minutes to produce KAMABOKO and testing the KAMABOKO for jelly strength by use of an OKADA type jelly strength gauge.

From the foregoing table, it can be understood that although the fish meat slurry containing acetic acid shows a similar decrease in viscosity to that for the fish meat slurry using carbonic acid, the fish meat powder obtained from the former slurry by spray-drying exhibits decisively poorer jelly strength or poor KAMABOKO-forming property as compared with the powder from the latter slurry. In the case of the fish meat powder obtained from the slurry using carbonic acid, the jelly strength is not inferior to that of the fish meat powder obtained from the slurry incorporating no acid.

This superior jelly strength is due to the fact that in the fish meat slurry prepared by using acetic acid, the acetic acid is not thermally decomposed at the time of spray-drying and remains contained therein and therefore, denaturation of the muscular protein of fish meat occurs, whereas in the fish meat slurry prepared by using carbonic acid, the carbonic acid is instantaneously decomposed at the time of spray-drying to permit the pH value of the slurry to return to its original level approximating neutrality.

Even when carbonic acid or some similar acid which is readily decomposed at low temperatures is used for the purpose of this invention, the muscular protein of fish meat is susceptible to denaturation at acidic pH values of the fish meat slurry. For this reason, it is important that the fish meat slurry be subjected to spray-drying as soon as permissible after its preparation.

The present invention, as described above, uses, as the raw material, either fresh fish meat or a frozen ground fish meat and converts it into a slurry in the presence of an acid easily decomposed at low temperatures, whereby the fish meat slurry thus formed permits efficient spray-drying and the fish meat powder consequently produced by this spray-drying step has high preservability due to substantially unimpaired freshness of the meat (KAMABOKO-forming property possessed inherently by the raw fish meat).

The present invention will be described more specifically herein below with reference to a preferred embodiment but is not to be construed as being limited to this embodiment.

EXAMPLE

A fish meat powder was obtained by mincing raw fish meat (a frozen ground fish meat available on the market) in the presence of added carbonated water so as to produce a fish meat slurry with lowered viscosity and a solids content of 8% and spray-drying the resultant slurry. Specifically, 50 kg of a frozen ground pollack meat having a solids content of 20% and a pH of 7.2 was finely divided with a cutter and a chopper. Carbonated water (pH 6.3) was separately prepared by bubbling carbon dioxide through 75 kg of water. The finely divided fish meat and the carbonated water were mixed together and then converted into a slurry by a colloid mill. The resultant fish meat slurry was found to have pH 6.3 and a viscosity of 50 poises.

The fish meat slurry prepared as described above was filtered and thereafter spray-dried. The fish meat powder formed as a consequence of the spray-drying exhibited a viscosity and binding property similar to that of the fresh fish meat when it was merely combined with a suitable amount of water. This fish meat powder could be used in its unaltered form as the starting material for various food products. When kneaded with a suitable amount of table salt, it exhibited the same degree of KAMABOKO-forming property as ordinary fish meat. When 1 kg of the fish meat powder (6% water content) prepared as described above was kneaded in the presence of 3.7 kg of water added thereto, then kneaded with table salt (incorporated in an amount of 2.7% by weight) by an ordinary method, finally kneaded in the presence of 7% by weight of starch, packed in a casing, heated to produce KAMABOKO and tested for jelly strength by use of an OKADA type jelly strength gauge, it was found to have 305 (g) of jelly strength. A control prepared from the same frozen ground fish meat by the same procedure was found to have 340 (g) of jelly strength.

What is claimed is:
1. A method for preparing an undenatured fish meat powder comprising:
   mixing fish meat in an aqueous medium to form an aqueous slurry;
   adding carbonic acid to said aqueous slurry; and
   spray-drying said slurry to form the fish meat powder at a temperature sufficient to decompose said carbonic acid.

2. The method of claim 1 wherein said carbonic acid is added to said aqueous slurry by bubbling carbon dioxide through said aqueous slurry to form carbonic acid.

3. The method of claim 1 wherein said fish meat slurry is obtained by mincing fresh fish meat.

4. The method of claim 1 wherein said fish meat slurry is obtained by mincing of frozen ground fish meat.

5. The method of claim 1 wherein said slurry formed in the mixing step has a pH value approximately neutral and wherein said acid is added in an amount sufficient to adjust the pH of the slurry to a value within the range of 6.0–6.6 and, upon decomposition of said acid, the pH of the slurry returns to approximate neutrality.

6. The method of claim 5 wherein the aqueous slurry formed in the mixing step has a pH in the range of from 6.8 to 7.2.

7. A method of preparing an undenatured fish meat powder comprising:
   mixing fish meat with an aqueous solution of carbonic acid to form an aqueous slurry; and
   spray-drying said slurry at a temperature sufficient to decompose said carbonic acid.

8. The method of claim 7 wherein said fish meat slurry is obtained by mincing fresh fish meat.

9. The method of claim 7 wherein said fish meat slurry is obtained by mincing frozen ground fish meat.

10. The method of claim 7 wherein the pH of said slurry formed in the mixing step is 6.0–6.6 and wherein, upon decomposition of said acid, the pH of said slurry becomes approximately neutral.

11. The method of claim 10 wherein the pH becomes 6.8 to 7.2 upon decomposition of said acid.

* * * * *

UNITED STATES PATENT OFFICE
CERTIFICATE OF CORRECTION

Patent No. 3,959,517       Dated May 25, 1976

Inventor(s) Hiroshi Niki; Eiki Deya; Toru Doi; Seiichiro Igarashi; Kenkichi Ahiko; and Hiromichi Hayashi It is certified that error appears in the above-identified patent and that said Letters Patent are hereby corrected as shown below:

Column 1, line 54, "spray drying" should read --spray-drying--.

Column 2, line 68, "in" should read --if--.

Column 3, line 1, after "and" insert --if--;

line 39, "through" should read --though--.

Signed and Sealed this

Twenty-seventh Day of July 1976

[SEAL]

Attest:

RUTH C. MASON
*Attesting Officer*

C. MARSHALL DANN
*Commissioner of Patents and Trademarks*